United States Patent
Yamamoto

(10) Patent No.: US 7,263,137 B2
(45) Date of Patent: Aug. 28, 2007

(54) MULTIVALUED FSK MODULATION SYSTEM

(75) Inventor: Michio Yamamoto, Mobara (JP)

(73) Assignee: Futaba Corporation, Mobara-shi, Chiba-ken (JP)

( * ) Notice: Subject to any disclaimer, the term of this patent is extended or adjusted under 35 U.S.C. 154(b) by 656 days.

(21) Appl. No.: 10/427,068

(22) Filed: Apr. 30, 2003

(65) Prior Publication Data
US 2003/0206602 A1 Nov. 6, 2003

(30) Foreign Application Priority Data
May 1, 2002 (JP) ............... 2002-129670

(51) Int. Cl.
*H03C 3/00* (2006.01)
*H03K 7/06* (2006.01)

(52) U.S. Cl. ............... 375/303; 375/272; 375/268; 375/334; 446/458; 340/825.72

(58) Field of Classification Search ............... 375/272, 375/303, 334, 268; 446/456; 340/825.72
See application file for complete search history.

(56) References Cited

U.S. PATENT DOCUMENTS

| 3,699,445 A | * | 10/1972 | Kinsel | 398/187 |
| 5,412,687 A | * | 5/1995 | Sutton et al. | 375/133 |
| 5,960,040 A | * | 9/1999 | Cai et al. | 375/279 |

* cited by examiner

*Primary Examiner*—Mohammed Ghayour
*Assistant Examiner*—Mohsin Benghuzzi
(74) *Attorney, Agent, or Firm*—Quarles & Brady LLP

(57) ABSTRACT

A multivalued FSK modulation system is provided in which when data to be transmitted is multivalued and transmitted/received, the detection level is different every symbol. When a two-valued signal is transmitted as one symbol, data (11), (01), (00) and (10) are previously set to be, for example, a shift of −6, a shift of +6, a shift of +2, and a shift of −2, respectively. When data to be input next is (00), mapping is performed so as to provide a sign weight of +2 from the sign weight at the position of current data. When the data to be input next is (10), mapping is performed so as to provide a sign weight of −2 from the position of the current sign weight. Thus, even if data of the same level is input, signals can be always detected in different levels, so that the sign detection point is not specified erroneously.

4 Claims, 4 Drawing Sheets

TRANSMITTER

RECEIVER

FIG.2

| SYMBOL | | SHIFT AMOUNT |
|---|---|---|
| $Y_1$ | $Y_2$ | |
| 1 | 1 | -6 |
| 0 | 1 | +6 |
| 0 | 0 | +2 |
| 1 | 0 | -2 |

FIG.3

| SIGN WEIGHT | TRANSITION | | | | | | | |
|---|---|---|---|---|---|---|---|---|
| | 1 | 2 | 3 | 4 | 5 | 6 | 7 | 8 |
| +7 | 10 | | 11 | | 01 | | 00 | ■ |
| +5 | | 11 | | 01 | | 00 | ■ | 10 |
| +3 | 11 | | 01 | | 00 | ■ | 10 | |
| +1 | | 01 | | 00 | ■ | 10 | | 11 |
| -1 | 01 | | 00 | ■ | 10 | | 11 | |
| -3 | | 00 | ■ | 10 | | 11 | | 01 |
| -5 | 00 | ■ | 10 | | 11 | | 01 | |
| -7 | ■ | 10 | | 11 | | 01 | | 00 |

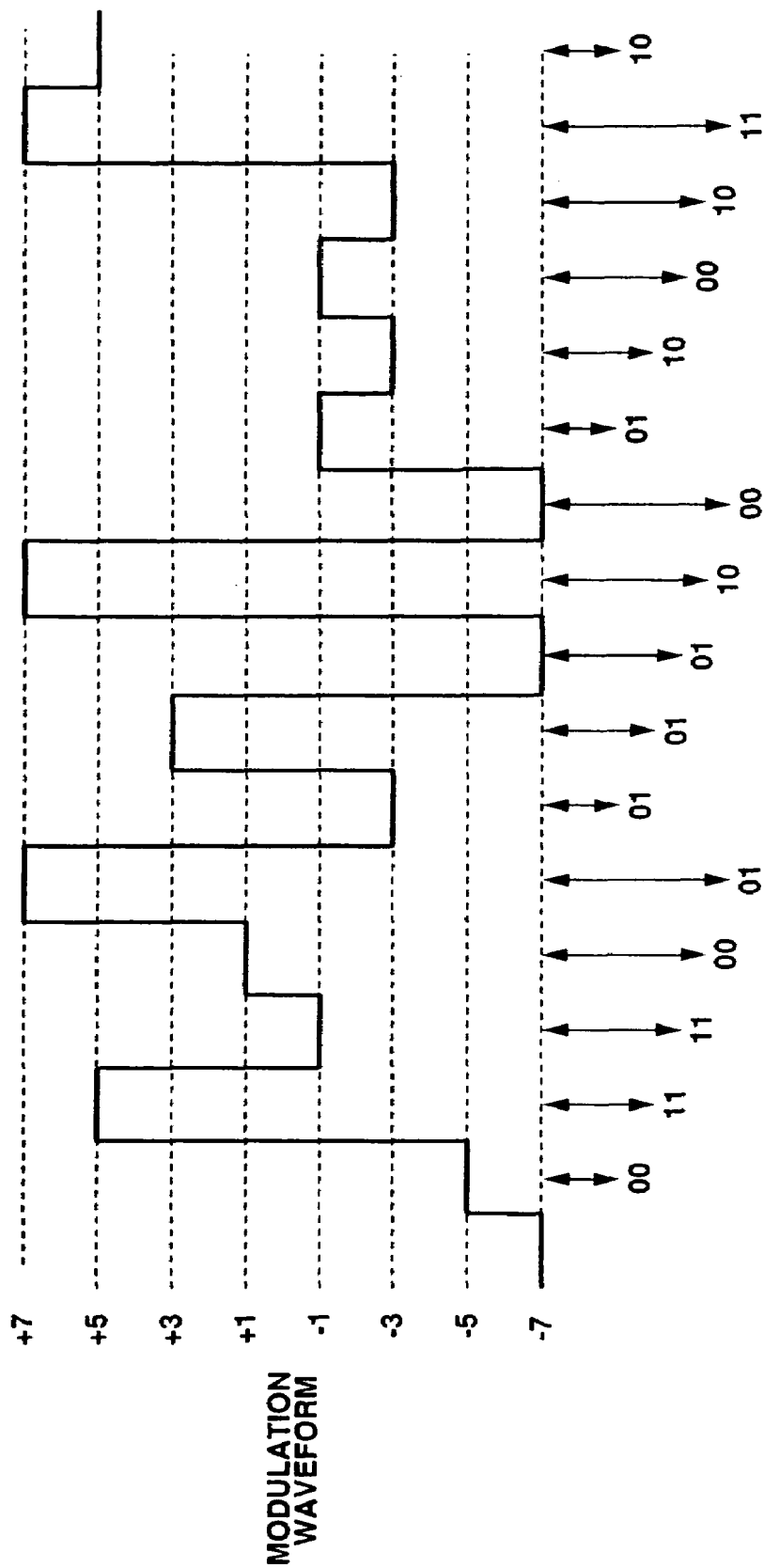

TRANSMITTER (PRIOR ART)

RECEIVER (PRIOR ART)

MODULATION WAVEFORM

MULTIVALUED FSK MODULATION SYSTEM

CROSS REFERENCES TO RELATED APPLICATIONS

Not Applicable

STATEMENT REGARDING FEDERALLY SPONSORED RESEARCH

Not Applicable

BACKGROUND OF THE INVENTION

The present invention relates to a radio control device for controlling an object at a remote place based on control data transmitted with radio waves. More particularly, the present invention relates to a multivalued FSK (Frequency Shift Keying) modulation system suitable for frequency-modulating carrier frequencies and transmitting and receiving multivalued data.

The radio-control (abbreviated as R/C) device for manipulating a moving device or instrument from the remote place by control information carried on radio waves is widely known. Model cars and model ships are an example of the moving objects to be operated by the radio wave.

Because such an apparatus generally uses narrow-band modulation signals permitted by Radio Wave Law, control is made using binary (or two-value) pulse data. However, when increasing the data transmission rate to improve the responsibility of the controlled device, the band width of the carrier frequency becomes wide. In consequence, it creates such a problem that intersymbol interference occurs between control signals in neighbor channels.

In order to overcome such a problem, it may be considered that control data is converted into a multi-valued value, e.g. two bits into one symbol to transmit the converted data so that the transmission rate can be increased without changing the time transmitting one symbol in a conventional system.

FIGS. 5(a) and (b) schematically shows a device for remotely transmitting two-valued data as four-valued data in accordance with the conventional system. In FIG. 5, numeral 11 represents a 2-to-4 value conversion circuit that receives digital input data of a binary (0, 1) for control. Numeral 12 represents a frequency modulator that frequency modulates a carrier frequency with data output converted by the 2-to-4 value conversion circuit. Numeral 13 is a high-frequency power amplifier that amplifies a modulated carrier signal and then feeds it to a transmission antenna 14.

A receiving antenna 21 receives radio waves transmitted from the transmitter 13. A high-frequency amplifier 22 amplifies the radio waves received by the antenna 21 to a signal of a constant level. The frequency detector 23 formed of a discriminator receives the amplified signal and then outputs it as a predetermined voltage level (e.g. a four-valued voltage).

In an embodiment of the present invention, four-valued dc voltage components are detected. However, the next 4-to-2 value conversion circuit 24 converts four-valued levels into a predetermined code signal.

In FIG. 5(c), the code signal is shown on the four-valued frequency/amplitude plane. For example, the frequency f0 corresponds to a 2-bit code signal of "00". The frequency f1 corresponds to a 2-bit code signal of "01". The frequency f2 corresponds to a 2-bit code signal of "11". The frequency f3 corresponds to a 2-bit digital signal of "10".

In the case of the four-valued FSK modulation system, when the same symbols of transmission data are sequentially produced, the frequency detector often produces outputs of the same amplitude level for a long period of time regardless of the 2-to-4 value conversion. Thus, it becomes difficult to perform the inter-symbol decoding of a digital signal (or to detect a sign point). As a result, the detecting data is erroneous.

In order to prevent such a problem, there are proposed modulation systems which insert a preamble signal during a predetermined period of time, while the same signs are not continuously output during encoding, or invert the next sign to the previous sign when the same data continues. However, these systems are disadvantageous in that the information transmission efficiency is markedly decreases, because extra data is added to the original data.

SUMMARY OF THE INVENTION

The present invention is made to solve the above-mentioned problems.

An object of the present invention is to provide an improved multivalued FSK modulation system.

According to the present invention, a multivalued FSK (Frequency Shift keying) modulation system comprises the steps of obtaining a modulation signal in correspondence with differential data to a previous symbol value; differentially encoding (mapping) the modulation signal; subjecting signs between symbols to different conversion; and differentially encoding mapped data.

BRIEF DESCRIPTION OF THE DRAWINGS

This and other features and advantages of the present invention will become more apparent upon a reading of the following detailed description and drawings, in which:

FIG. 2 is a table listing sign weights for differential encoding;

FIG. 3 is an explanatory diagram illustrating current data mapped based on previous data;

FIG. 4 is a waveform diagram partially showing a modulated waveform shifted through mapping;

DETAILED DESCRIPTION OF THE PREFERRED EMBODIMENT

Figure 1A:
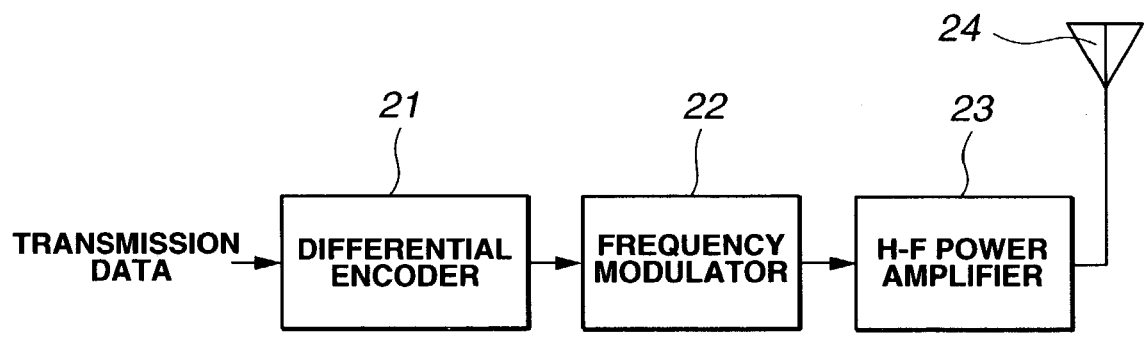
FIGS. 1(a) and 1(b) are block diagrams illustrating a transmitter/receiver employing a multivalued modulation system according to the present invention.
Figure 1B:
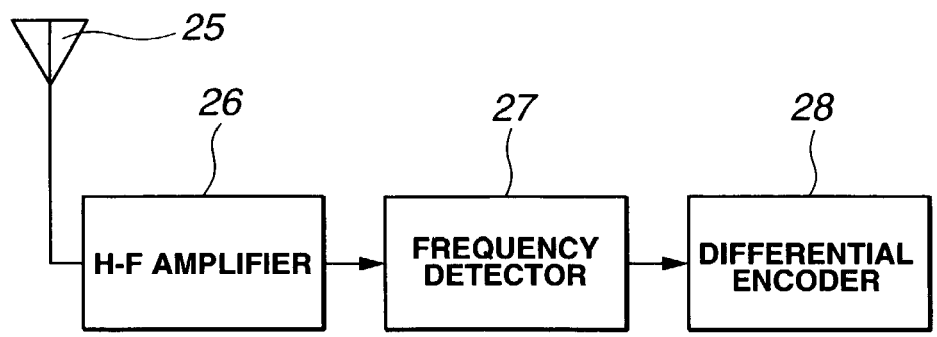
Figure 5A:
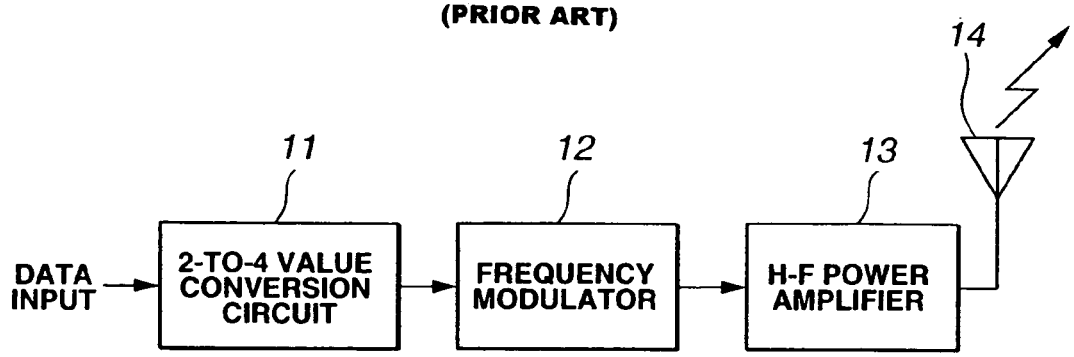
FIGS. 5(a) and 5(b) are block diagrams illustrating a conventional transmitter/receiver for two-value-to-four-value conversion.
Figure 5B:
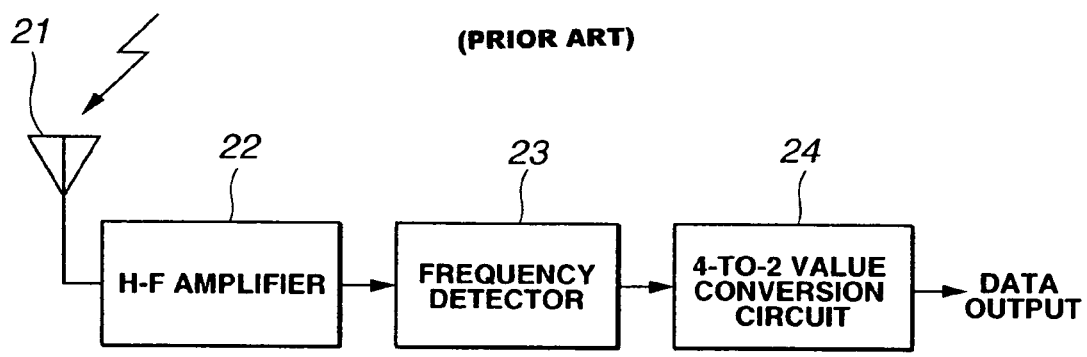
Figure 5C:
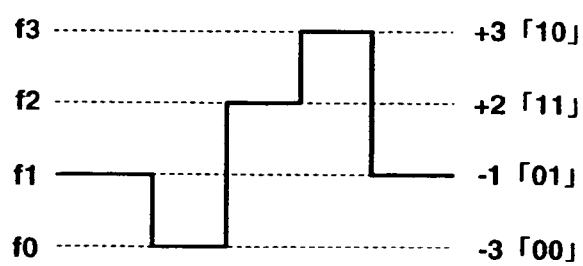
FIG. 5(c) is a waveform diagram showing a code signal on a four-valued frequency/amplitude plane.

A multivalued FSK modulation scheme according to the present invention will be described hereinafter. FIG. 1 is a block diagram illustrating an embodiment according to the present invention. Referring to FIG. 1, numeral 21 represents a differential encoder (decoder) to which transmission data, such as for controlling a radio control device, is input. The differential encoder 21 is formed of a table on which next transmission data are mapped based on the previous transmission data as described later.

A frequency modulator 22 modulates frequency of modulation signals formed by the differential encoder 21. Preferably, the modulation signals include pulse code modulation (PCM) code data for radio control of a radio control device. A high-frequency power amplifier 23 amplifies the power of a modulated carrier frequency. The numeral 24 represents a transmission antenna.

A receiving antenna 25 receives information transmitted from the transmission side. Numeral 26 represents a high-frequency amplifier. Numeral 27 represents a frequency detector formed of a discriminator.

A differential encoder (decoder) 28 on the transmission side converts data decoded through mapping into the original sequence. Thus, control information on an object to be controlled can be obtained with the data from the differential decoder 28.

FIG. 2 is a table listing weight shift amounts showing the shift amount of data to be output next with four-valued data Y1, Y2 at a current time point input to the transmitter.

In FIG. 2, Y1, Y2 is data being a one symbol formed of two bits and indicates the interval during which the shift amounts thereof are mapped (or weight of sign).

FIG. 3 is a weight transition table listing how the sign weight of data changes. In FIG. 3, a black rectangular mark shows the sign position of a previous symbol. The left column shows a sign weight in terms of a weight shift amount and the horizontal axis represents a transition of data. As is apparent from FIG. 3, the weight of a four-valued FSK signal is mapped by differential encoding a two-bit signal on an 8-level amplitude plane every symbol. The table shows that the eight-valued sign weights are represented as (−7), (−5), (−3), (−1), (+1), (+3), (+5), and (+7), respectively. In this case, amplitude differential values +2, −2, +6, and −6 are provided to two-bit data (00), (10), (01), and (11), respectively.

Referring now to the transition 4 shown in FIG. 3. In the transition 4, a previous data weight position is (−1). When data input at a positive shift is (00), the shift amount becomes +2 as shown in FIG. 2. Thus, data becomes a level having a sign weight of +1, based on (−1)+(+2). In the transition 4, when a two-bit symbol to be input next is (10), the sign weight has a level of −3 (=(−1)+(−2)) because of a shift amount of −2 as shown in FIG. 2.

Similarly, when the data to be input next is (01) in the transition 4, the shift amount is +6. Hence, the sign weight becomes +5. When data is (11), the shift amount is −6 and the sign weight level is −7. When the sign weight level becomes less than −7, the shift amount shifts to +7. The weight distance between +7 and −7 is set to ±2.

The sign weight shifts by ⅛ every symbol. Each symbol has a different sign weight so that the run-length 1 is guaranteed. The weight distance of each symbol is 4 which corresponds to the same distance as that in the conventional 4-FSK system. This provides the same error-rate characteristics.

A different bit in the neighboring one symbols is 1 only and is converted in a Gray code. A Gray code is an ordering of $2^n$ binary numbers such that only one bit changes from one entry to the next. This can prevent the numeral value from being largely skipped because of one-bit error.

As is apparent from the sign table, when symbols (00) and (10) appear continuously, the sign weight shifts by ⅛. Judging from that nature, the modulation scheme according to the present invention can be called a ⅛-shift 4-FSK modulation system.

In the decoding, frequency detection is performed in a similar manner to that of the conventional 4-FSK modulation system so that the symbol returns to the baseband region. Thus, 2-bit data can be evaluated based on an amplitude differential amount between received data and the previous data.

FIG. 4 shows a sign weight transition (modulation waveform) corresponding to the symbol value when the symbol weight of −7 is an initial value.

A four-valued symbol sequence used in this embodiment and shown in FIG. 4 is 0011110001010101100001100010110. As shown in FIG. 4, there is no continuous frequency plane.

According to the present invention, when a multivalued signal is formed from a two-valued signal, the signal amplitude of a symbol point changes every symbol. For this reason, the symbol synchronization can be easily established when the data obtained by the differential decoder is received on the receiving side.

The present invention is advantageous in that the sign transmission efficiency does not deteriorate, because it can be avoided that data of the same amplitude is transmitted without adding redundant data.

Moreover, in the present invention, the frequency amplitude plane has eight values but the inter-symbol distance every symbol is the same as that of the 4-FSK modulation system. Accordingly, the error rate characteristic of the present invention is the same as that of the 4-FSK system.

Obviously, many modifications and variations of the present invention are possible in the light of the above teachings. It is therefore to be understood that within the scope of the appended claims, the invention may be practiced otherwise than as specifically described.

What is claimed is:

1. A multivalued FSK (Frequency Shift keying) modulation method comprising the steps of:
    setting a different shift amount for each symbol data;
    mapping a sequence of said symbol data on amplitude plane by determining a sign weight of a next symbol data on the basis of said different shift amount for each symbol data and a sign weight of a previous symbol data to obtain multivalued differentially mapping data; and
    forming a modulation signal by modulating frequency of said mapping data; wherein said mapping is performed in such a manner that sign weight levels assigned to the next differentially mapping data are absolutely different from the sign weight levels assigned to the previous differentially mapping data on said amplitude plane.

2. The multivalued FSK modulation method as defined in claim 1, wherein said modulation signal comprises PCM code data for radio control.

3. The multivalued FSK scheme modulation method as defined in claim 1, wherein said data mapped is formed of a Gray code.

4. A multivalued FSK (Frequency Shift keying) modulation method comprising the steps of:
    setting a different shift amount for each four 2-bit symbol data;
    mapping a sequence of said 2-bit symbol data on an amplitude plane by determining a sign weight of a net symbol data on the basis of said different shift amount for each four 2-bit symbol data and a sign weight of a previous symbol data to obtain four-valued differentially mapping data; and
    forming a modulation signal by modulating frequency of said mapping data;
    wherein said mapping is performed in such a manner that said four-valued differentially mapping data are assigned to eight sign weight levels on said amplitude plane so that four of said eight sign weight levels assigned to the next four-valued differentially mapping data can be absolutely different from the four-sign weight levels assigned to the previous four-valued differentially mapping data.

* * * * *